United States Patent
Tirosh et al.

(10) Patent No.: US 12,078,735 B2
(45) Date of Patent: Sep. 3, 2024

(54) PROXIMITY-BASED NAVIGATION METHOD

(71) Applicant: VEERIDE GEO LTD., Rehovot (IL)

(72) Inventors: Ehud Tirosh, Zion (IL); Zvi Lapidot, Rehovot (IL)

(73) Assignee: VEERIDE GEO LTD., Rehovot (IL)

( * ) Notice: Subject to any disclaimer, the term of this patent is extended or adjusted under 35 U.S.C. 154(b) by 241 days.

(21) Appl. No.: 17/397,667

(22) Filed: Aug. 9, 2021

(65) Prior Publication Data

US 2022/0043163 A1 Feb. 10, 2022

(30) Foreign Application Priority Data

Aug. 10, 2020 (GB) ...................................... 2012414

(51) Int. Cl.
*G01S 19/41* (2010.01)
*G01S 19/07* (2010.01)
(Continued)

(52) U.S. Cl.
CPC ............ *G01S 19/41* (2013.01); *G01S 19/071* (2019.08); *H04W 4/40* (2018.02); *G01S 19/07* (2013.01);
(Continued)

(58) Field of Classification Search
CPC ........ G01S 19/07; G01S 19/071; G01S 19/40; G01S 19/41; H04W 4/023; H04W 4/024; H04W 4/40; H04W 4/80
(Continued)

(56) References Cited

U.S. PATENT DOCUMENTS 5,523,761 A * 6/1996 Gildea .................... G01S 19/36
  29/722
5,969,672 A   10/1999 Brenner
(Continued)

FOREIGN PATENT DOCUMENTS

CN    102044145 A  *  5/2011  .......... G01S 5/0072
DE  102006 016396 A1   10/2007
(Continued)

OTHER PUBLICATIONS

Yang, Jian & Poellabauer, Christian & Mitra, Pramita. (2017). Using Bluetooth Low Energy for Dynamic Information-Sharing in Vehicle-to-Vehicle Communication. SAE International Journal of Passenger Cars—Electronic and Electrical Systems. 10. 10.4271/2017-01-1650. (Year: 2017).*
(Continued)

*Primary Examiner* — Chuong P Nguyen
(74) *Attorney, Agent, or Firm* — Richard T. Black; FISHERBROYLES, LLP

(57) ABSTRACT

A method for improving accuracy of a raw GPS positioning of an untargeted pedestrian device wherein the pedestrian device receives from a nearby vehicle device a message containing a calculated offset between a raw GPS location of the vehicle and a corrected location of the vehicle, the message being received as a direct consequence of the pedestrian device and the vehicle device coming into mutual communication range without a need for pairing between the two devices. The calculated offset is applied to the raw GPS positioning of the pedestrian device to obtain a more accurate location of the pedestrian device.

8 Claims, 4 Drawing Sheets

(51) Int. Cl.
  *H04W 4/40* (2018.01)
  *G01S 19/40* (2010.01)
  *H04W 4/02* (2018.01)
  *H04W 4/024* (2018.01)
  *H04W 4/80* (2018.01)

(52) U.S. Cl.
  CPC ............. *G01S 19/40* (2013.01); *H04W 4/023* (2013.01); *H04W 4/024* (2018.02); *H04W 4/80* (2018.02)

(58) Field of Classification Search
  USPC .......................... 342/357.44, 357.23, 357.24
  See application file for complete search history.

(56) References Cited

U.S. PATENT DOCUMENTS

| | | | | |
|---|---|---|---|---|
| 6,323,803 | B1* | 11/2001 | Jolley | G01S 19/41 342/357.44 |
| 6,429,808 | B1 | 8/2002 | King et al. | |
| 7,769,393 | B2* | 8/2010 | Jendbro | G01S 19/05 342/357.46 |
| 9,213,081 | B2 | 12/2015 | Tarlow et al. | |
| 9,332,384 | B2* | 5/2016 | Bombacino | H04B 1/7156 |
| 10,241,209 | B2* | 3/2019 | Feldhaus | G01S 19/03 |
| 11,812,342 | B2* | 11/2023 | Lapidot | G01S 19/396 |
| 2007/0159388 | A1* | 7/2007 | Allison | G01S 19/25 342/357.29 |
| 2007/0225016 | A1* | 9/2007 | Jendbro | G01S 19/05 342/357.42 |
| 2008/0052000 | A1 | 2/2008 | Furstenburg | |
| 2009/0115656 | A1 | 5/2009 | Raman et al. | |
| 2009/0115657 | A1* | 5/2009 | Cheng | G01S 19/05 342/357.42 |
| 2009/0121927 | A1* | 5/2009 | Moshfeghi | G01S 19/22 342/357.44 |
| 2011/0257885 | A1 | 10/2011 | Tuck et al. | |
| 2012/0139782 | A1* | 6/2012 | Gutt | G01S 5/009 342/357.29 |
| 2013/0093618 | A1* | 4/2013 | Oh | G01S 19/45 342/357.44 |
| 2013/0116908 | A1* | 5/2013 | Oh | G05D 1/0278 701/96 |
| 2014/0292567 | A1* | 10/2014 | Feldhaus | G01S 19/07 342/357.4 |
| 2017/0347245 | A1 | 11/2017 | Kumar | |
| 2018/0208140 | A1* | 7/2018 | Sugimoto | G01S 19/40 |
| 2021/0072400 | A1* | 3/2021 | Kwon | G01S 19/071 |
| 2021/0072405 | A1* | 3/2021 | Kwon | G06V 20/582 |

FOREIGN PATENT DOCUMENTS

| | | |
|---|---|---|
| DE | 102011051100 A1 | 12/2012 |
| KR | 101 092 914 B1 | 12/2011 |
| KR | 101092914 B1 | 12/2011 |
| KR | 102134862 B1 | 7/2020 |
| WO | 2014/080252 A1 | 5/2014 |

OTHER PUBLICATIONS

Garello et al, "Peer-to-Peer Cooperative Positioning Part I: GNSS-Aided Acquisition" Inside GNSS. March/Apr. 2012. pp. 55-63. (Year: 2012).*

Marcel, Bluetooth is Getting Precise with Positioning Systems, Bluetooth® Technology Website, https://www.bluetooth.com/blog/bluetooth-positioning-systems/, Feb. 13, 2019 (last printed Jul. 6, 2021).

Combined Search and Examination Report under Sections 17 and 18(3) dated Feb. 10, 2021, UK Intellectual Property Office for GB2012414.5.

Updated Search and Examination Report under Sections 17 and 18(3) dated Feb. 24, 2021, UK Intellectual Property Office for GB2012414.5.

* cited by examiner

PROXIMITY-BASED NAVIGATION METHOD

CROSS-REFERENCE TO RELATED APPLICATION

This application claims priority from GB2012414.5 filed Aug. 10, 2020, whose contents are incorporated herein by reference.

FIELD OF THE INVENTION

This invention relates to navigation systems and methods particularly for use by pedestrians.

BACKGROUND OF THE INVENTION

With the ever-increasing widespread use of smartphones, GPS has become widely used by pedestrians and drivers as a principal method of navigation. Of high importance is the use of smartphones GPS by pedestrians in urban areas, as a navigation aid, instead of traditional paper maps. However, pedestrian use of GPS is inconvenient, difficult and sometimes impossible owing to the low positioning accuracy of GPS systems in mobile phones, mainly in urban areas. The main reason for the low accuracy of GPS systems in urban areas is the obstruction of the lines of sight to satellites due to high buildings. Furthermore, in some cases, signals from satellites reflected by high buildings are wrongly interpreted by a pedestrian GPS receiver resulting in large errors in positioning readings. This phenomenon is referred to as "multiple path reflection". The location error, therefore, depends on the location and time, which relates to the satellite's constellation.

Although multiple path reflection affects motor vehicles as well as pedestrians, it is less pronounced in motor vehicles because, since they are constantly on the move at significantly higher speeds than pedestrians, their respective satellite visibilities are constantly and rapidly changing and errors can therefore be smoothed. Also, since the location of cars and other road vehicles is restricted to roads, techniques such as "snap to map" and utilization of IMU data and other information are used.

Likewise, sensors such as cameras, RADAR, LIDAR and other enhancements being developed for use by Advanced Driver Assistance Systems (ADAS) are also used to improve vehicles location accuracy.

Furthermore, development of autonomous vehicles, for which sub-lane positioning accuracy is essential, has led to an ongoing effort to improve vehicles positioning accuracy.

While vehicles positioning accuracy keeps improving, pedestrian positioning error still may be significant and limits the usefulness of pedestrian navigation systems.

This drawback has become a major issue for companies like Uber and Lyft, where successful passenger pickup by a driver highly depends on the location accuracy reported by the passenger's GPS. Driver and client may miss each other just because the client is across the street or across a junction. This limitation will become all the more critical in the future with the use of autonomous taxis.

Attempts have been made to improve GPS positioning error, including 3D modelling of the surrounding buildings to ignore satellites having multiple reflection, phase analysis and statistical methods.

There is a wealth of prior art relating to localization of autonomous vehicles and to optimization of localization strategies used by an autonomous vehicle based on a driving context, for example, the geographical region in which the autonomous vehicle is driving, the time of day, the speed of the autonomous vehicle, etc. In conventional systems, a map database may be used to snap the location calculated from the navigation satellite system data to a physical geographical object, such as a road, to create a final, more accurate output to be displayed by the navigation device. Such means are disclosed, for example, in US20110257885 where the coarse location provided by the GPS satellites may be significantly improved, so that the improved location is sufficient for guiding vehicles, whether autonomous or driven. The contents of all prior art referred to in this document are incorporated herein by reference.

Also known in the art is the use of short-range communication between a vehicle and a pedestrian whereby a vehicle is able to determine location data of the pedestrian.

For example, US20180208140 discloses an on-vehicle device that communicates wirelessly with a mobile terminal of a target person located in a vicinity of the vehicle. A positioning signal transmitted by a positioning satellite and received by both the mobile terminal and the on-vehicle device. The on-vehicle device also receives from the mobile terminal his acquired location. By using the correction signal received by the on-vehicle device, along with the target person acquired location, the on-vehicle device is thereby able to calculate the absolute positions of the vehicle and the mobile terminal with high accuracy based on the corrected positioning signals. The on-vehicle device may transmit to the mobile terminal the vehicle location information, together with the corrected terminal location information, thus allowing the mobile terminal to detect the relative location of the vehicle. The on-vehicle device may return to the mobile terminal both the vehicle location information and the terminal location information that are corrected. Alternatively, the on-vehicle device can return to the mobile terminal a relative distance between the vehicle and the terminal possessor calculated from the vehicle location information and the terminal location information.

Principally, such an approach allows the on-vehicle device to correct the location of a pedestrian accurately, provided that the pedestrian transmitted to the on-vehicle device his coarse location. This is useful for taxi drivers or autonomous vehicles to determine accurately where a waiting passenger is located. It does allow for the corrected location of the pedestrian to be conveyed also to the pedestrian, but this has to be done actively at the initiative of the vehicle and the pedestrian. In other words, the accurate determination of the pedestrian's location is always performed by a specific vehicle, typically a taxi, vis-à-vis a specific pedestrian whose coarse location obtained by his GPS has been shared with the on-vehicle device.

Such an approach will allow a targeted pedestrian to determine his or her accurate location. But it will not allow an untargeted pedestrian not sharing his coarse location to make a similar determination.

U.S. Pat. No. 9,213,081 likewise discloses a system wherein two portable devices in close mutual proximity share respective positioning data using the Bluetooth Low Energy protocol. A first device includes a Wi-Fi receiver and makes measurements of a set of Wi-Fi access points that are detectable by the device. Typically, the Wi-Fi measurements made by the devices include the BSSID and RSSI (received signal strength indication) of each access point. The measured data may be shared with a second device also having a Wi-Fi receiver but not having access to a data set identifying the locations of access points in the local area and which therefore cannot itself determine its location. Similar techniques can allow both devices to improve their location estimates or to determine their location where it is not possible using either set of positioning data atone. Sharing positioning data allows devices to detect and/or correct for erroneous location estimates.

In this system, the devices communicate autonomously when they come within communication range, typically 50 m in accordance with the Low Energy Bluetooth protocol. But when used to convey positioning data from an unobstructed device to an obstructed device that is not itself in communication with a set of Wi-Fi access points and so cannot accurately determine its location, the obstructed device can at best estimate its location based on the received data of the unobstructed device. The error may be assumed to be small since the devices can be at most 50 m apart, but the location of the obstructed device is still inaccurate. Alternatively, when both devices are unobstructed, by sharing their respective positioning data they can both compute a more accurate measurement if, by sharing their data, they thus have access to data from an increased number of Wi-Fi access points.

Reference is also made to an article titled "*Bluetooth is Getting Precise with Positioning Systems*" (downloaded from the Bluetooth® Technology Website at: https://www.bluetooth.com/blog/bluetooth-positioning-systems/) describing the use of Bluetooth technology to determine the physical location of devices. Conventionally, these systems have relied on the use of received signal strength (RSSI) measurements to estimate the distance between Bluetooth devices that are part of the system. Using this technique, positioning systems can achieve meter-level accuracy when determining the location of a specific device. This may be further enhanced by adding a direction finding feature allowing systems to use both signal strength and direction when determining the location of a device and, as a result, achieve greater accuracy—down to centimeter-level. Such techniques are used in real-time locating systems and indoor positioning systems where the location of a roaming device can be established relative to a fixed device whose location is known and with which the roaming device may effect Bluetooth communication to establish its own location.

However, these enhancements do not help to determine the location of a roaming device such as a pedestrian navigation system that is not within broadcast range of a fixed Bluetooth™ pylon.

DE102011051100 discloses a method for improving the accuracy of a mobile device held by a pedestrian. A passing vehicle transmits to the pedestrian device a correction signal being the difference between the vehicle's coarse GPS position and a corrected position that may be determined by a vehicle navigation system or using fixed reference points whose exact positions are known. The use of fixed landmarks whose positions are known to improve the coarse positioning determined by GPS is well-known and is conventionally referred to as D-GPS (differential GPS). D-GPS is also described in US 2008/0052000. Use of D-GPS to improve the relative positions of moving vehicles and a mobile base station is disclosed in US 2013/0116908. Systems and methods for global differential positioning are disclosed in US 2009/0115656.

U.S. Pat. No. 6,429,808 discloses an integrity monitor for a cellular network positioning system, which informs mobile stations, their users, or networks of measurement quality and warns them of failing and failed GPS satellites by isolating them from the effects of these failures. Whenever an unhealthy satellite is detected, its corresponding assistance data will be excluded for delivery or for position determination.

U.S. Pat. No. 5,969,672 discloses a system to determine, from inertial reference and GPS receiver apparatus acceleration signals the failure of a GPS satellite signal by comparison of the acceleration signals and to monitor newly acquired GPS satellite signals to determine if a satellite drift was present prior to acquisition. If an undependable satellite signal is encountered and detected and there are at least six satellites in view with good geometry, a deselect signal is presented, in which case, groups of five satellite signals can be compared so as to determine which one, if any, of them is faulty. If one is so identified, then this information is passed to a satellite selection function which eliminates the faulty satellite.

KR101092914 discloses a method for correction of pseudorange by eliminating a signal from an anomalous GPS satellite.

KR102134862 discloses a method and device for estimating a coarse position using a distance change rate to quickly determine a user's location.

SUMMARY OF THE INVENTION

It is therefore an object of the invention to enhance positioning accuracy of an untargeted roaming device.

It is a particular object of the present invention to provide methods that address the need to enhance pedestrian positioning accuracy, taking advantage of motor vehicle increased positioning accuracy, enabling more useful pedestrian navigation systems.

Another objective of the present invention is to enhance the effectiveness of driver-passenger encounters.

Yet another object of the present invention is to filter out fluctuating satellite signals transmitted by a satellite to a GPS positioning device in a GPS positioning system.

These objects are achieved in accordance with different aspects of the invention by a method according to the respective independent claims.

Most mobile communication devices such as smartphones are equipped with short-range wireless communication such as Bluetooth™ and Low Energy Bluetooth (BLE) aimed at communicating with other devices in close proximity. When a first such device is brought into broadcast range of a second similar device equipped with Bluetooth™, or BLE, the first device is detected by the second device and they both exchange messages containing a 48-bit unique device ID (Mac-Add), in the case of Bluetooth™, and an additional 48 bytes of free format device description (such as "Samsung S8").

The present invention exploits this communication in order to transfer GPS positioning errors, derived from vehicle raw GPS positioning and corrected positioning, namely $\{\Delta X, \Delta Y\}$, from nearby motor vehicles to an untargeted pedestrian located in the vicinity of the vehicle. The correction data, $\{\Delta X, \Delta Y\}$, can be transferred using the free format device description, as a response to the pedestrian phone scanning. It is not specifically a feature of the present invention how the error is computed by the navigation system, this being known per se. For our purposes, it is sufficient to understand that vehicle navigation systems receive raw GPS data corresponding to coarse location in space, which can be represented by coordinates $\{x, y, z\}$ relative to a predetermined origin, such as the center of mass of the entire Earth system. These coordinates correspond to latitude, longitude, and height. In practice, we can ignore the height because it may be assumed that when a pedestrian is within short-range communication with a vehicle, any height difference is negligible. Therefore the difference between the received latitude and longitude coordinates and the corresponding accurate coordinates constitutes the error $\{\Delta X, \Delta Y\}$.

In such a way, a pedestrian standing near a road initiates Bluetooth scanning, so that any vehicle passing by his vicinity receives the enquiry, and by means of an application according to the present invention transmits back the GPS location error, determined From the vehicle GPS raw positioning and the corrected location. Once received by the pedestrian device, the $\{\Delta X, \Delta Y\}$ correction can be applied to pedestrian GPS positioning by means of an application according to the present invention. This can be done by standard Bluetooth communication or BLE (Low Energy Bluetooth) communication. In both cases, no pairing between the pedestrian BT device and the vehicle BT device is required, as explained below.

Within the context of the description and the appended claims, the term "untargeted" is used to mean that the pedestrian device is not specifically addressed by the vehicle device. Rather, depending on the wireless protocol employed, the vehicle device transmits its computed error, which is received by a pedestrian device in communication range. Prior to receipt, the pedestrian device is unknown to the vehicle device and vice versa. After receipt, the identity of the vehicle will become known to the pedestrian device and vice versa, although in both cases no pairing between the two devices is initiated.

In one embodiment standard Bluetooth communication is used. In this case, the vehicle BT is set to be visible at all times and the pedestrian's BT device searches for available BT transmitters. A software application in the vehicle device encodes the correction $\{\Delta X, \Delta Y\}$ as part of the vehicle device name. The Bluetooth standard message usually includes 48 bits of the vehicle device address (BD_ADDR) and another up to 248 bytes, which usually include the vehicle device name. These bytes are modified by the vehicle device application to include the $\{\Delta X, \Delta Y\}$ correction, i.e. the application continuously replaces some of the 248 bits of the BT message by the correction data. Once a vehicle Bluetooth device is detected by a pedestrian, a software application in the pedestrian device extracts the correction $\{\Delta X, \Delta Y\}$ from the received name of the vehicle device. Significantly, no pairing is needed since the Bluetooth protocol allows the pedestrian device to identify the name of any Bluetooth device within range, without the need to exchange data. Conversely, the name of the pedestrian device will be known to the vehicle device, but not its location.

In a similar way, Low Power Bluetooth (BLE) can be used. The vehicle acts as an Advertiser, transmitting periodically $\{\Delta X, \Delta Y\}$ positioning correction related to current location. The pedestrian, while scanning, gets as response the $\{\Delta X, \Delta Y\}$ correction.

In order to ensure that the vehicle is indeed in the vicinity of the pedestrian, in both cases the received signal intensity (Received Signal Strength Indication, RSSI) may be used by the pedestrian's receiver as an indication of the distance between the vehicle and the pedestrian. In such a way, $\{\Delta X, \Delta Y\}$ corresponding to maximal RSSI and thus to minimal distance, will be used.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
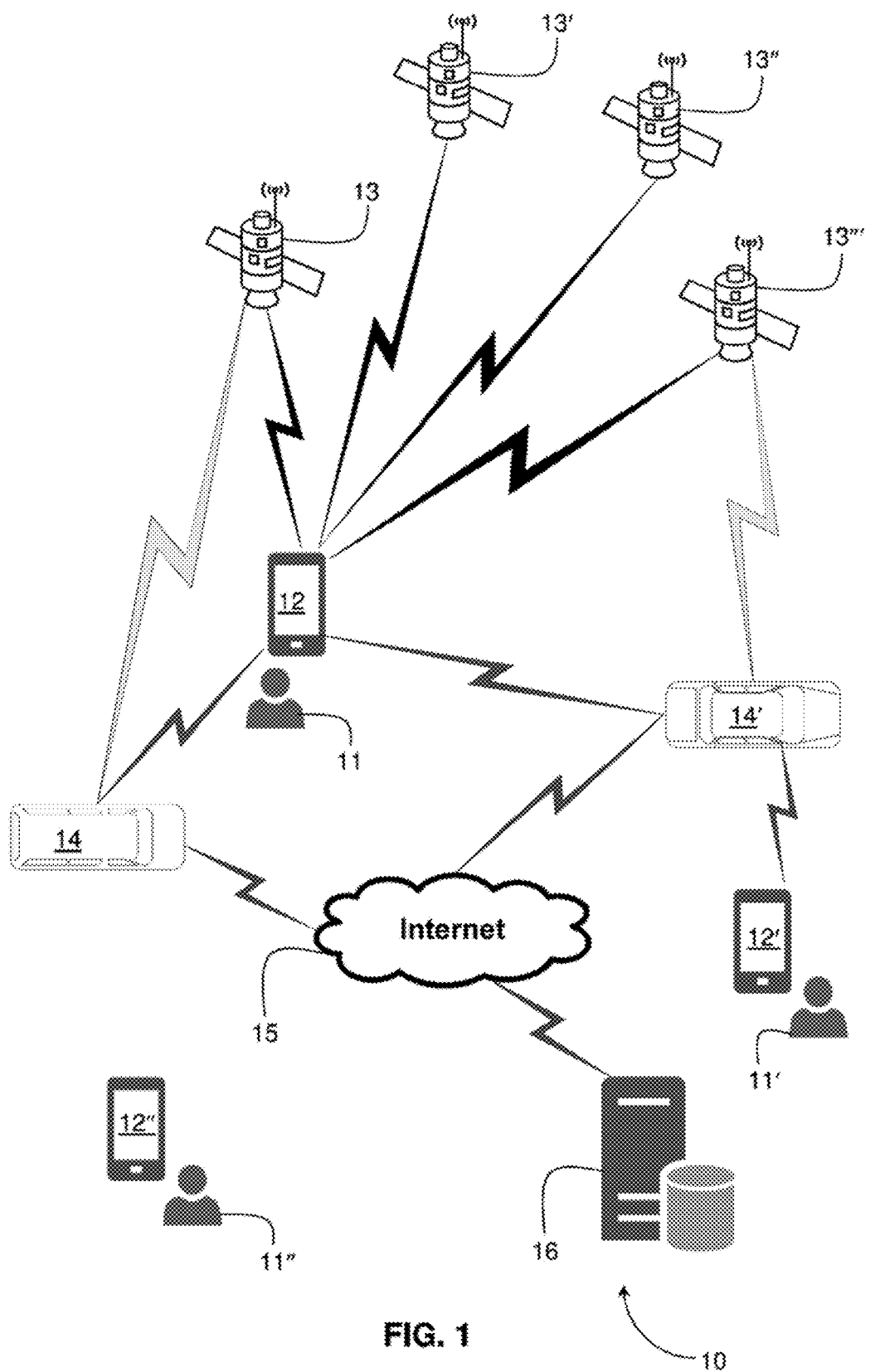
FIG. 1 is a pictorial representation of a system according to the invention.

FIG. 1 is a pictorial representation of a system 10 according to one embodiment of the invention. The system 10 shows a pedestrian 11 located in a region of interest holding a smartphone 12 having a built-in GPS module that receives GPS signals from at least four satellites 13, 13' 13" and 13'". The GPS signals include the time on which the signals were transmitted by the satellite. The receiver records the time on which the signals were received, and the difference between the times of transmission and receipt reflects the time of flight between the satellites to the receiver, which when multiplied by the speed of light, results in the pseudo-range between the satellites and the receiver. This is referred to as "pseudo-range" because unlike the highly accurate atomic clocks of the satellites, the receiver's clocks are not as accurate. Therefore, at least four satellites are needed to solve for the receiver's coarse location in known manner. Throughout this description and the appended claims, we will refer to this coarse location as the GPS coordinates of the GPS device. Vehicles 14, 14' that randomly drive through the region of interest likewise receive GPS data from satellites and determine respective coarse locations of the vehicles. For the sake of clarity, each of the vehicles is shown connected to only a single satellite, although in practice each receives signals from at least four satellites, which may or may not be the same as those of other vehicles and may be the same as or different to those from which the smartphone 12 receives its GPS signals. Likewise, although FIG. 1 depicts communication between the smartphone 12 and one or more vehicles, in fact the communication is established between the smartphone 12 and a suitable communications device in each vehicle that is coupled to or is integral with a vehicle navigation system such as WAZE™, SATNAV™ and the like which enhances accuracies in the GPS coordinates so that the correct or true location of each vehicles is known. For the sake of clarity, by "true" or "correct" it is not intended to imply that the corrected locations are precise in absolute terms, but rather that they are significantly more accurate than the coarse locations explained above. Anyone who has used a navigation system such as WAZE™ is well aware that they are instructed in advance to turn left at the next junction and when they are on top of the junction are instructed "turn left". It is this level of accuracy that renders navigation systems so reliable and user-friendly.

For the sake of completeness, FIG. 1 shows a second pedestrian 11' located in broadcast range of the vehicle 14' so that communication is established between a smartphone 12' carried by the second pedestrian 11' and the vehicle 14'. On the other hand, a third pedestrian 11" carrying a smartphone 12" is out of communication range with any of the vehicles and so no communication is established between a vehicle device and the smartphone 12". However, all pedestrian smartphones 12, 12' and 12" will receive coarse GPS satellite data, although for simplicity not all of the satellite connections are shown in the figure.

The navigation systems in the vehicles enhance the accuracy for the coarse locations based solely on the satellite signals, using auxiliary data, based for example, on accurate maps that have been pre-compiled and which allow the location of the vehicle to be corrected using known techniques such as snap to map.

Likewise, techniques such as RADAR, LIDAR and other enhancements being developed for use by Advanced Driver Assistance Systems (ADAS) may be used to determine enhanced location accuracy.

Although only two vehicles are shown in the figure, it is to be understood that in practice there are thousands of vehicles driving over time along charted routes such as highways, roads, streets and even off-road paths whose locations have been accurately mapped and are accessible to the vehicle navigation systems either because map data is pre-loaded or because they are able to access the map data on-line, typically over the Internet 15. The invention is predicated on the assumption that at any given time, there will be a sufficient flow of traffic in the vicinity of the pedestrian to ensure that at least one vehicle will pass close by and facilitate the transfer of location correction data from the vehicle navigation system to the pedestrian's location device at sufficiently close time intervals.

The invention is based on the random ad hoc connection between a vehicle navigation system and a pedestrian location device in close proximity to communicate errors in the raw location data as determined by the vehicle navigation system to the pedestrian location device. Owing to the close proximity of the vehicle to the pedestrian, typically less than 50 meters, it may be assumed that the errors are equally applicable or sufficiently so, to allow the pedestrian location device to apply the same errors to its raw determination of location and thereby establish a much more accurate measure of location.

The required proximity between the smartphone 12 and those vehicles in communication range therewith is achieved by configuring the smartphone 12 and the vehicle devices to communicate by means of a radio protocol whose range is limited such that two devices in communication with one another must be in close proximity (i.e. a short range radio protocol), or by arranging that the devices communicate by means of a radio protocol that is not limited to short range and configuring the pedestrian device to monitor received signal strength between the devices in order to ensure that the devices are in close proximity to one another. For example, the software application resident on the pedestrian device could be configured to use the positioning error of another device only if signals from that other device are received with signal strength above a predetermined level.

A suitable short range radio protocol is Bluetooth or Bluetooth Low Energy. Bluetooth has a typical maximum range outdoors of around 100 meters for Class 1 devices and around 10 meters for Class 2 devices; Bluetooth Low Energy has a typical maximum range outdoors of around 50 meters.

In common with the normal Bluetooth™ protocol, BLE also works in 2.4 GHz ISM band, reserved internationally for industrial, scientific and medical (ISM) purposes other than telecommunications. BLE has 40 channels of which 37 are data channels and with 3 are advertising channels, each channel's bandwidth being 2 MHz data packets transmitted between these channels are positioned in two kinds of events: Advertising and Connection events.

Bluetooth advertising is permission based advertising, which means that when a mobile device receives a Bluetooth message, it has the choice to either accept or decline the message. This is analogous to a pop-up ad that appears in response to an Internet search. The recipient has the choice to click on the ad or ignore it. However, regardless of how the user responds, the web browser receives and displays the ad and is obviously aware of the ad content. So, too, in BLE advertising, the vehicle device sends an ad which is received by any pedestrian device in broadcast range, typically 15 to 40 meters in class 2 Bluetooth enabled mobile devices. Upon receiving the advertisement from the vehicle device, the pedestrian device merely processes the information to extract the error $\{\Delta X, \Delta Y\}$, which it then applies to its own coarse positioning to compute a more accurate location. The advertisement packet has 31 data bytes available for use. This should be sufficient to send the error message, but if not, the pedestrian smartphone can request more information from the advertising device without forming a connection through a Scan Request. The BLE vehicle device receives the Scan Request and responds with a Scan response.

Respective software programs are installed in vehicle and pedestrian navigation systems.

Figure 2:
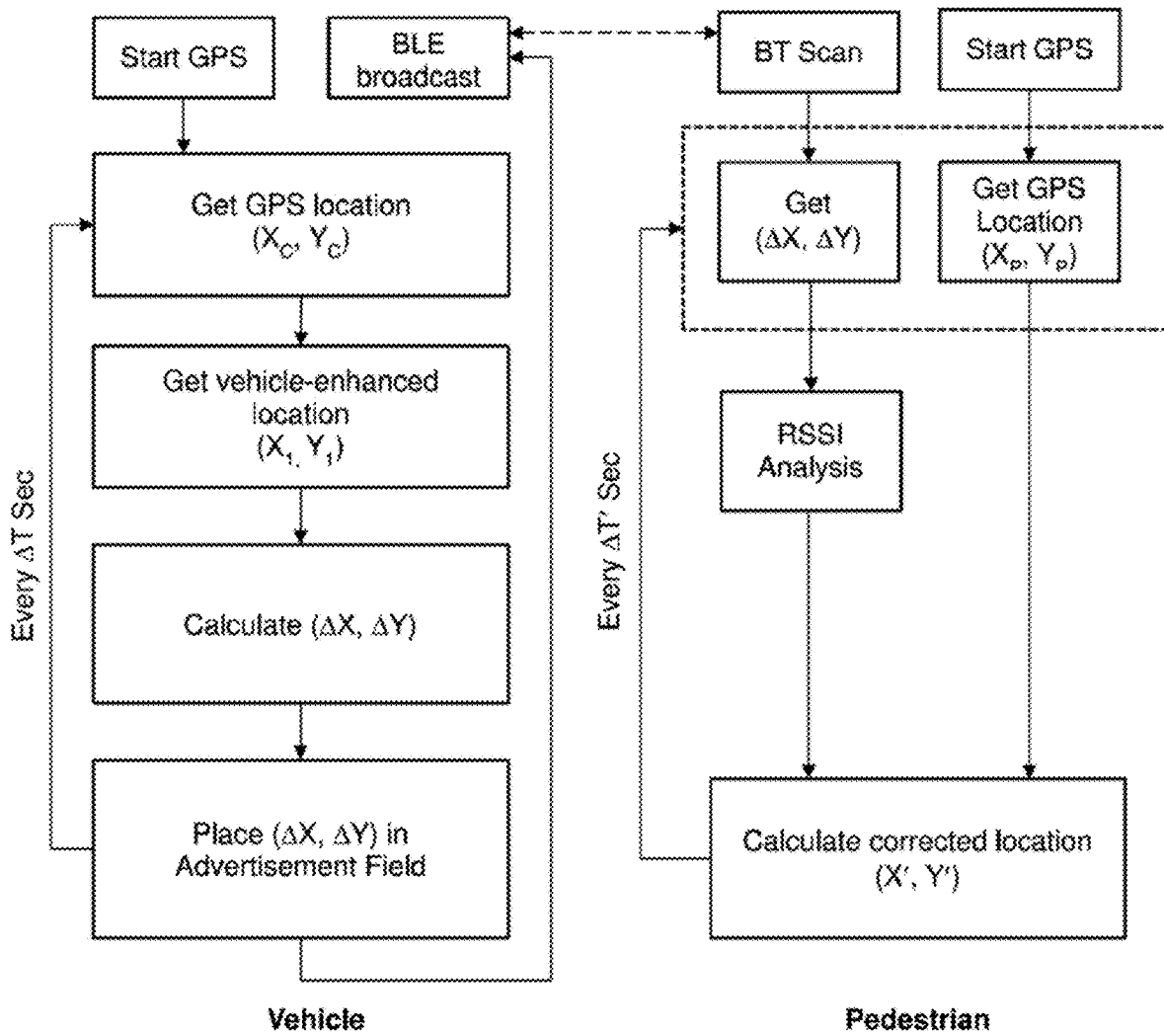
FIG. 2 is a combined flow chart showing the principal operations carried out by applications in enhanced vehicle and pedestrian location systems according to a first embodiment of the invention.

Thus, referring to FIG. 2, the vehicle program continuously calculates GPS location error based on instantaneous GPS raw positioning and navigation system corrected positioning, and generates an error message $\{\Delta X, \Delta Y\}$, which is broadcast as a BLE advertisement. When the vehicle Bluetooth detects an enquiry from a nearby pedestrian smartphone, the vehicle program sends the error message as a response. The pedestrian software program detects the error message as a response to Bluetooth scanning and applies it to the raw GPS positioning obtained by the pedestrian smartphone, resulting in a corrected positioning.

A software program resident in the pedestrian smartphone scans for BLE Advertising. When such Advertising is detected from a device in close proximity, the Advertiser error message is decoded to extract the correction $\{\Delta X, \Delta Y\}$, which is applied to correct pedestrian positioning. In many urban situations, several vehicles may broadcast different error messages to the pedestrian device in short succession. In such case, the pedestrian device needs to know which of the received messages is most relevant and to discard the other messages. This is achieved by performing RSSI (Received Signal Strength Indicator) analysis on the broadcast signals to determine which is strongest. It may then be assumed that the strongest signal was broadcast by the closest vehicle, for which the error signal is therefore most pertinent. There may, however, be situations where the broadcast range is limited to such a low value, e.g. 10 meters for Class 2 devices that any received error message is sufficiently reliable, in which case such discrimination is unnecessary.

Figure 3:
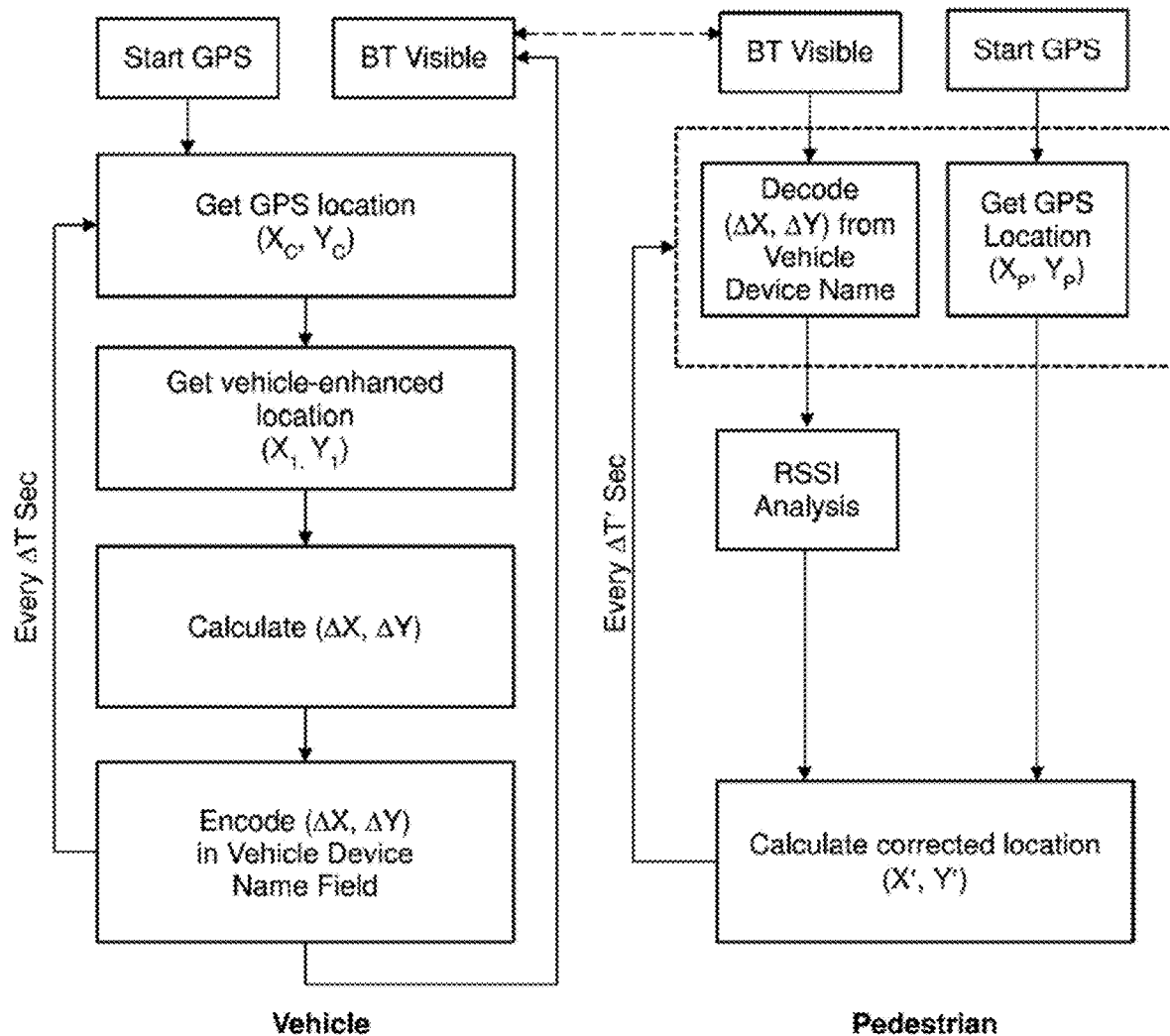
FIG. 3 is a combined flow chart showing the principal operations carried out by applications in enhanced vehicle and pedestrian location systems according to a second embodiment of the invention.

Alternatively, as shown in FIG. 3, instead of using BLE, standard Bluetooth communication may be used. In this case, the vehicle BT is actuated to be continuously visible and the pedestrian's BT searches for available BT devices. As is known, visible BT devices that are in range of another visible device transmit a standard message containing basic information that identifies the sending device. This information usually includes 48 bits of the device address (BD_ADDR) and another up to 248 bytes of free text, which usually include the Device's name. The vehicle device application in effect changes the name on-the-fly to include the $\{\Delta X, \Delta Y\}$ correction, i.e. the application continuously replaces some of the 248 bits of the BT message by the correction data. Once a vehicle Bluetooth device is visible to a pedestrian device, the correction {ΔX, ΔY} is received by the pedestrian device and may be extracted and processed as described above. Here also no pairing is needed.

Obviously, the application software in both the vehicle and pedestrian devices must encode and decode the correction {ΔX, ΔY} in complementary manner. Thus, assuming that the correction {ΔX, ΔY} is appended to the name of the vehicle device, delimiters can be used to separate the value ΔX from the name and to separate between ΔX and ΔY. Alternatively, a fixed number of bytes can be allocated for the name and for each of the component errors ΔX, ΔY.

The manner in which the device name is changed to include this information is known per se and will typically depend on the operating system of the vehicle device. For example, reference may be made to https://stackoverflow-.com/questions/8377558/change-the-android-bluetooth-device-name, which describes how the local Bluetooth name used to identify the device in discovery mode may be changed programmatically using setName(String name) of BluetoothAdapter type, e.g.

```
private BluetoothAdapter bluetoothAdapter = null;
  bluetoothAdapter = BluetoothAdapter.getDefaultAdapter( );
  void ChangeDeviceName( ){
    Log.i(LOG, "localdevicename : "+bluetoothAdapter.getName( )+"
localdeviceAddress : "+bluetoothAdapter.getAddress( ));
    bluetoothAdapter.setName("NewDeviceName");
    Log.i(LOG, "localdevicename : "+bluetoothAdapter.getName( )+"
localdeviceAddress : "+bluetoothAdapter.getAddress( ));
  }
```

Figure 4:
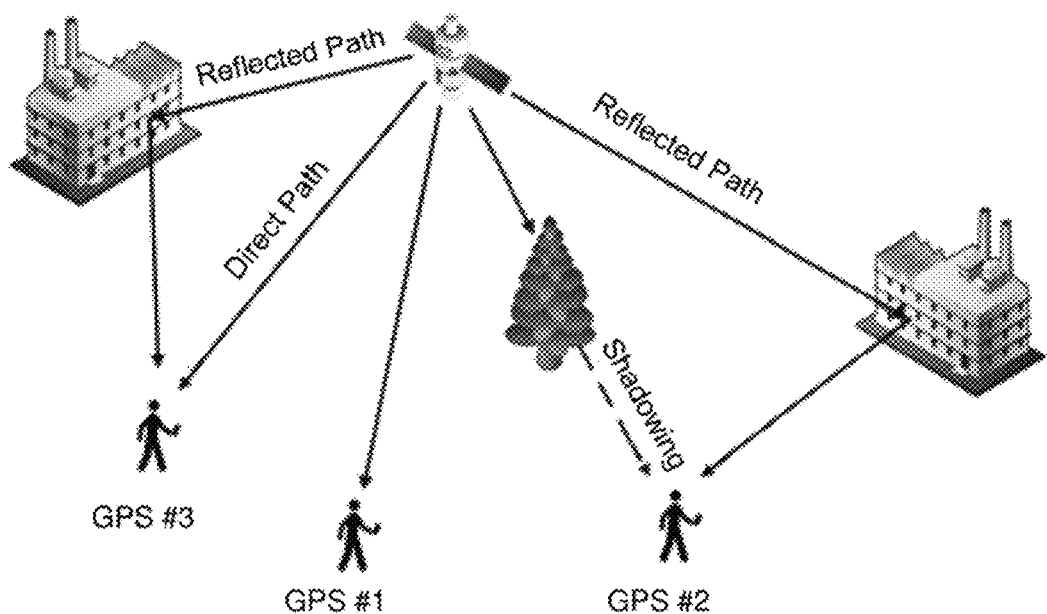
FIG. 4 is a pictorial representation showing common sources of errors in GPS location systems.

FIG. 4 shows possible impacts of buildings and other objects on the accuracy of pseudo-range measurement and GPS positioning accuracy. An ideal situation is shown for GPS #1, where there is only direct Line of Sight between the satellite and the receiver. In this case, subject only to atmospheric influence, the measurement of the pseudo-range between the satellite and the receiver is reliable, and provided that all other pseudo-ranges will be as reliable as this one, so too will be the resulting calculated location.

In the case of GPS #2, there is no direct Line of Sight between the satellite and the receiver, and only a reflected signal is received. In this case, an overestimated, though stable, pseudo-range will be measured, which may result in an error in the final calculated location.

In the case of GPS #3, both direct and reflected signals are received. These two signals may add to each other with any random phase difference between 0° and 180°, and therefore the resulting pseudo-range may be either overestimated or underestimated. Also, small changes in either the direct signal or the reflected signal may change the relative phase in which they are added, and therefore, unlike in the previous cases, even small changes may cause large differences in the pseudo-range readings. As a result, the resulting pseudo-range will be unstable, subject to random and rapid fluctuations.

In the embodiments described above, information is shared between the mobile terminal and the on-vehicle device by wireless communication in conformance with the Bluetooth or BLE standards. The use of BT and BLE has been described because of their ubiquity but it will be appreciated that other short-range wireless protocols may be employed such as, WiFi or possibly ZigBee.

In accordance with another aspect of this invention, there is provided a novel way for filtering out GPS signals resulting from interference between direct and reflected signals, as in the case of GPS #3 in FIG. 4. In this case, unlike GPS #1 and GPS #2, the interference between direct and reflected signals creates unexpected, fluctuating pseudo-range values. Therefore, there is a need to filter out such signals, both in vehicle and pedestrian applications. This may be done by analyzing over time the pseudo-ranges of all satellites and filtering out those which fluctuate over time. This analysis proceeds continuously for all satellites so that the signal of a filtered-out satellite is reinstated as soon as its signal stops fluctuating. "Filtering-out" may be achieved, for example, by setting the signal-to-noise ratio (SNR) of fluctuating satellite signals to zero, causing the location processing to ignore them.

In this connection it will be borne in mind that GPS satellite signals include SNR as part of the raw data: so this information is already available to both the pedestrian and vehicle GPS systems and indeed is used by GPS positioning systems to ignore satellite signals whose SNR is zero or below some other nominal preset threshold. It is therefore possible to program the software in both devices to set the SNR of an incoming satellite signal to a predetermined SNR threshold below which the signal is ignored while continuing to monitor all incoming signals so that when signal fluctuations from a previously "ignored" satellite exceed the preset SNR threshold, the signal from this satellite is no longer ignored and is used, provided of course that it exceeds the preset threshold.

For the sake of completeness, it will be appreciated that measurement of fluctuations may be based on a measured amplitude or intensity of the fluctuations such as standard deviation or any suitable function thereof.

Such a method can be implemented by both the vehicle navigation device and the pedestrian device either in conjunction with the above-described method for improving accuracy of a raw GPS positioning of an untargeted pedestrian device or independently of such a method.

It will also be understood that the system according to the invention may be a suitably programmed computer. Likewise, the invention contemplates a computer program being readable by a processing unit for executing the method of the invention. The invention further contemplates a non-transitory machine-readable memory tangibly embodying a program of instructions executable by the processing unit for executing the method of the invention.

The invention claimed is:

1. A method for improving accuracy of a raw GPS positioning of an untargeted pedestrian device, the method comprising:
   (a) providing a vehicle device, nearby to the untargeted pedestrian device, comprising an identifying name field of the vehicle device,
      wherein the identifying name field comprises information that identifies the vehicle device and a calculated offset between a raw GPS location of the vehicle device and a corrected location of the vehicle device;
   (b) the untargeted pedestrian device receiving from the vehicle device nearby in Bluetooth™ communication range a message containing the identifying name field, and is received without a need for pairing between the two devices;
   (c) the untargeted pedestrian device ensuring the vehicle device is within a sufficiently respective narrow range of the untargeted pedestrian device so the calculated offset is applicable to the untargeted pedestrian device, wherein the sufficiently respective narrow range is within a range capable of detecting a Bluetooth signal, wherein the detecting the Bluetooth signal is selected from a group of detecting methods comprising:

employing a Bluetooth™ protocol that permits mutual communication only within the sufficiently respective narrow range; and relating only to respective signals from a passing vehicle whose measured respective signal strength exceeds a predetermined threshold;

(d) the untargeted pedestrian device decoding the message to extract the calculated offset; and (e) applying the calculated offset to the raw GPS positioning of the untargeted pedestrian device so as to obtain a more accurate location of the untargeted pedestrian device.

2. The method according to claim 1, wherein the vehicle device is configured to:

(a) obtain a coarse location of the vehicle device;

(b) obtain a corrected location of the vehicle device;

(c) compute the calculated offset; and (d) encode the calculated offset in the Bluetooth™ in the message of the vehicle device for decoding by the untargeted pedestrian device when in communication range of the vehicle device.

3. The method according to claim 1, further including the following operations carried out by the untargeted pedestrian device:

(a) receiving multiple respective signals from different vehicles in communication range of the untargeted pedestrian device, each signal containing a respective offset $\{\Delta X, \Delta Y\}$;

(b) for each received signal determining a respective signal intensity (Received Signal Strength Indication, RSSI); and (c) using the respective offset $\{\Delta X, \Delta Y\}$ from whichever of the signals has maximal RSSI.

4. The method according to claim 1 for allowing a vehicle to locate a pedestrian, the method further including:

(a) receiving from the untargeted pedestrian device a corrected location; and (b) locating the pedestrian based on the received corrected location.

5. The method according to claim 1, wherein at least one of the untargeted pedestrian device and the vehicle device filters out fluctuating satellite signals by:

(a) receiving from at least four satellites respective GPS signals identifying time of transmission;

(b) determining a time of receipt of the GPS signals;

(c) computing an effective time of transit and a pseudo-range between the satellite and the untargeted pedestrian device and/or the vehicle device;

(d) repeating (a) to (c) for successive signals so as to obtain successive values of the pseudo-range between each satellite and the pedestrian device and/or vehicle device;

(e) computing fluctuations between the successive values of the pseudo-range for each satellite; and (f) while an amplitude of the fluctuations or a function thereof for a given satellite exceeds a preset threshold, ignoring the signals from the given satellite.

6. The method according to claim 5, wherein ignoring the fluctuating signals is achieved by setting a signal SNR of the signals to a preset value below a threshold in which the signals are ignored by GPS positioning software in the untargeted pedestrian and vehicle devices.

7. A non-transitory computer readable medium storing computer program instructions which when executed by a vehicle navigation device cause the vehicle navigation device to:

(a) obtain a coarse location of a vehicle;

(b) obtain a corrected location of the vehicle;

(c) compute an offset; and encode the offset in Bluetooth™ in a message of the vehicle navigation device for decoding by a pedestrian device when in comp range of the vehicle navigation device.

8. A non-transitory computer readable medium storing computer program instructions which when executed by a pedestrian positioning device cause the pedestrian positioning device to:

(a) receive from a nearby vehicle device in Bluetooth™ communication range a message containing an identifying name field without a need for pairing between the pedestrian positioning device and the vehicle device;

(b) ensure the vehicle is within a sufficiently respective narrow range of the pedestrian positioning device so a received offset is applicable to the pedestrian positioning device, wherein the sufficiently respective narrow range is within a range capable of detecting a Bluetooth signal, wherein the detecting the Bluetooth signal is selected from a group of detecting methods comprising employing a Bluetooth™ protocol that permits mutual communication only within the sufficiently narrow range; and relating only to respective signals from a passing vehicle whose measured respective signal strength exceeds a predetermined threshold;

(c) decode the message to extract the received offset; and (d) apply the received offset to the raw GPS positioning of the pedestrian positioning device so as to obtain a more accurate location of the pedestrian positioning device.

* * * * *